United States Patent

Yoshizumi et al.

[11] Patent Number: 5,917,181
[45] Date of Patent: Jun. 29, 1999

[54] PROFILE MEASURING APPARATUS

[75] Inventors: Keiichi Yoshizumi, Higashiosaka; Keishi Kubo, Moriguchi; Shoji Kusumoto, Osaka; Kiyokazu Uchimura, Sakai; Keinosuke Kanashima, Osaka, all of Japan

[73] Assignee: Marsushita Electric Industrial, Co., Ltd., Osaka, Japan

[21] Appl. No.: 08/831,080

[22] Filed: Apr. 1, 1997

[30] Foreign Application Priority Data

Apr. 5, 1996 [JP] Japan .................................. 8-084206

[51] Int. Cl.⁶ .................................................. G01B 11/00
[52] U.S. Cl. ...................... 250/230; 250/559.22; 33/561; 356/376
[58] Field of Search .................. 250/230, 559.22, 250/559.19; 356/376; 33/561, 556

[56] References Cited

U.S. PATENT DOCUMENTS

| | | | |
|---|---|---|---|
| 4,942,671 | 7/1990 | Enderle et al. | 33/559 |
| 5,018,280 | 5/1991 | Enderle et al. | 33/832 |
| 5,208,993 | 5/1993 | Harding | 33/559 |
| 5,315,374 | 5/1994 | Yoshizumi | 356/376 |
| 5,455,677 | 10/1995 | Yoshizumi et al. | |
| 5,459,939 | 10/1995 | Kubo et al. | 33/542 |
| 5,530,549 | 6/1996 | Brown | |
| 5,616,916 | 4/1997 | Handa et al. | 250/234 |
| 5,659,969 | 8/1997 | Butler et al. | 33/561 |

FOREIGN PATENT DOCUMENTS

| | | |
|---|---|---|
| 0100716 | 2/1984 | European Pat. Off. |
| 2284057 | 5/1995 | United Kingdom |
| 2302589 | 1/1997 | United Kingdom |

*Primary Examiner*—Edward P. Westin
*Assistant Examiner*—Thanh X. Luu
*Attorney, Agent, or Firm*—Price Gess & Ubell

[57] ABSTRACT

A profile measuring apparatus provided with an improved probe for measuring profiles throughout a wide area of the surface of an object with a high level of response and high accuracy. The probe 10 comprises an arm 3 having a stylus 1 fixedly mounted to the distal end thereof, which is coupled to a stationary part 11 of the apparatus by an arm holding member 5 made of a V-shaped leaf spring in such a way that the arm 3 is tilted in one axial direction by a contact pressure exerted thereto during measurement. Displacement of the arm 3 is thereby detected through measuring an elastic deformation of the leaf spring caused by the contact pressure exerted to the stylus 1 being pressed against the surface to be measured.

22 Claims, 7 Drawing Sheets

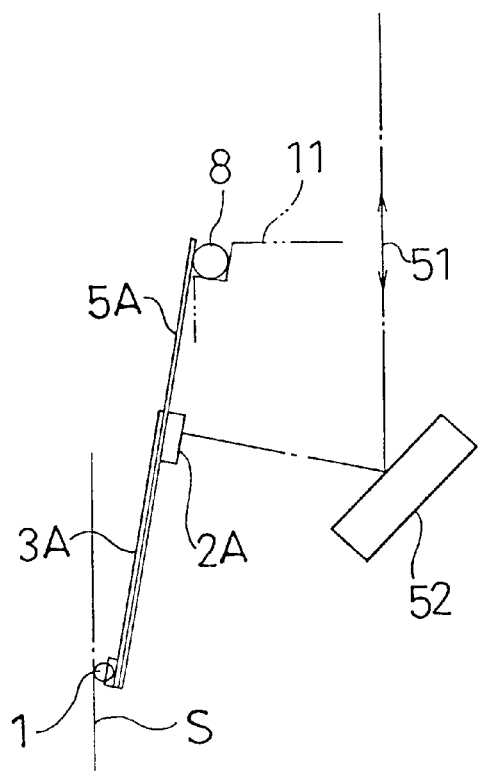
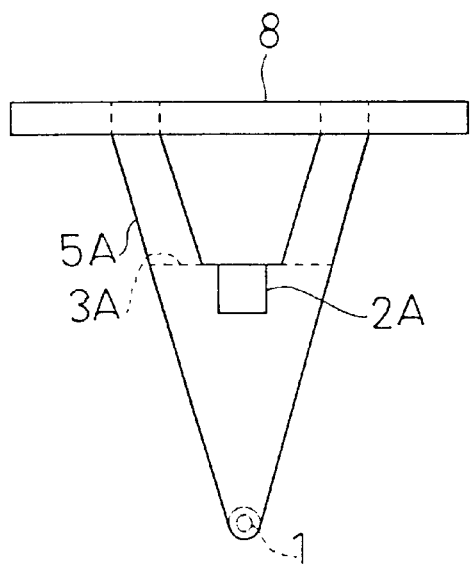
Fig.7A
Fig.7B

PROFILE MEASURING APPARATUS

BACKGROUND OF THE INVENTION

1. Technical Field of the Invention

The present invention relates to the construction of a contact probe for use with a surface roughness meter, a profile measuring machine, or a three-dimensional measuring machine, and particularly to a profile measuring apparatus for measuring the shape of a cross-section of a scroll compressor for an air-conditioner, an outer diameter of a video tape recorder cylinder, the precision of a cylindrical body, the degree of concentricity, an inner diameter of a bore, the shape of a cross-section of a central aperture, the straightness of a leading distance (e.g. less than 1 micrometer on a tape guide for compatibility of VTR tapes), and so on without damaging the surfaces to be measured under a lower pressure at a high speed and with high accuracy in the order of 0.1 to 0.01 $\mu$m.

2. Description of Related Art

A probe used for a surface roughness meter, a profile measuring machine, or a three-dimensional measuring machine may be selected from a contact probe, an interatomic force probe, an optical probe, a static capacitance sensor, and other applicable types. Neither the optical probe nor the static capacitance sensor are capable of measuring a side wall of a very small bore or of a minute step which is less than 0.1 mm such as a lead, and both are unfavorably used measurement of profile or roughness to as a high precision level as below 1 $\mu$m.

The contact probe produces a considerable rate of pressure during measurement and may damage the surfaces to be measured. A conventional type of the contact probe is equipped with an operating transformer. As such an operating transformer includes a magnet or magnetic core, it adds an extra weight to the moving part of the probe. Therefore, improvement of the response speed of the probe results in increasing the contact pressure during measurement. Even so, the conventional contact probe remains as low in the response speed as about 10 Hz.

One of the interatomic force dedicated probes is disclosed in Japanese Published Unexamined Patent Application 6-265340, which is lower in the contact pressure than the contact probe thus giving little opportunity to damage the surfaces being measured. If a stylus is made of a 0.5 mm radius ball of ruby and the contact pressure is less than 0.2 g, a repulsive force is developed in an energy gap between the stylus and the measuring surface by movements of tunnel electrons. Hence, the interatomic force probe is termed after this effect. The interatomic force probe disclosed in 6-265340 is however designed for measuring the profile of a flat or lens surface from above and its usage is limited.

A profile measuring apparatus disclosed in Japanese Published Unexamined Patent Application 6-160075 is designed for measurement of the profile of scroll blades and can be sed for a wider range of application. The apparatus has a stylus mounted to a leaf spring 12 and illuminated from behind. Since a mirror and its holder have to be located very close to the stylus, the entire construction is relatively intricate, and it is almost impossible to set the stylus within an aperture of 2 mm diameter.

As for a video tape recorder cylinder, it usually comprises an upper driving cylinder and a lower stationary cylinder. The lower cylinder has such a shape where the measurement is made on the diameter of a center bore, external diameter, surface roughness, straightness and height of a lead portion, parallelism between the upper and lower surfaces, verticalness of the lower surface to the bore or outer wall, concentricity and cylindrical degree of the bore and outer wall and bore, size of a bulged portion for eliminating tape running noise, and so on. A total of 26 points of measurement are necessary for the upper and lower cylinders. While it is possible to separately measure the upper surface, lower surface, outer side surface, and inner side surface of a cylindrical member such as a video tape recorder cylinder, the verticalness of the lower surface to the side surface of a bore in the cylindrical body cannot be obtained. In a prior art method, the measurement of those points has been carried out using five to six separate measuring apparatuses. However, if the cylindrical body or object to be measured is unloaded from one measuring apparatus and re-loaded to another, its orientation will change thus rarely permitting the measurement with submicron precision.

It is nevertheless essential to measure profiles of a digital video tape recorder in the order of 0.1 $\mu$m as compared with 1 $\mu$m in an analog video tape recorder.

Accordingly, it is desired to provide a profile measuring apparatus having a novel probe with such capacities as described below.

1. The probe is capable of measuring such objects as a cross-section of a small aperture and of a step of less than 0.1 mm on the surface of a lead portion of a video tape recorder cylinder with high accuracy at a high speed, which have not been the targets of a known interatomic force probe, without producing errors of measurement even when the measuring surface is tilted or the stylus generates friction.

2. An arm having a stylus at a distal end and a spring at a proximal end is provided, the inclination of which is measured at a high level of response and with high precision.

3. A laser beam is precisely directed to a small mirror for detecting tilting angles of the arm.

4. The contact pressure of the stylus is minimized in order to avoid damage to the measuring surfaces, to retard its wearing, and to eliminate measurement errors caused by deflection of its arm, as well as the weight of the stylus arm is reduced. This is because a large weight of the moving part of the arm will cause decrease in response acceleration speed, resulting in decrease in measuring speed, since the response acceleration speed A of the probe is expressed by A=contact pressure/weight of the movable part.

5. The probe is so constructed that when an excessive contact pressure is exerted on the stylus due to an erroneous operation, the probe retracts and is prevented from physical fracture.

6. Similarly, when a stress of an abrupt impact is applied to the stylus, it retracts and is prevented from physical fracture.

7. Since the data of measurements from the probe falls in a narrow range of less than 1 mm which is equivalent to the movable range of the probe, the apparatus is so constructed to obtain coordinates of the measuring points from a wider measuring area.

8. The measurement of profiles with the probe is carried out continuously and two- or three-dimensionally by scanning throughout the wider measuring area under substantially a constant rate of the contact pressure.

9. The measurement of profiles such as roundness with the probe is carried out by using a polar coordinate system as well as an orthogonal coordinate system.

10. The measurement is carried out for determining the thickness and both the rough and fine profiles of objects.

11. The measurement of profiles is carried out with high accuracy in the order of 0.01 µm in a coordinate system of the measuring points without being subject to the influence of poor straightness and pitching, yawing, and rolling motions of the stages.

12. The measurement of the verticalness of the upper or lower surface to the side surface as in a video tape recorder cylinder is carried out with high accuracy in the order of 0.01 µm without loading/unloading the object more than once.

SUMMARY OF THE INVENTION

Having described prior arts, it is a primary object of the present invention to provide a profile measuring apparatus being capable of measuring the profile and size of a wide range of objects at a high level of response and with high accuracy.

To accomplish the above-said objects, a profile measuring apparatus according to the present invention has a probe which comprises: an arm having a stylus fixedly mounted to a distal end thereof; an arm holding member made of a leaf spring which couples a portion close to a proximal end of the arm to a stationary part of the apparatus in such a way that the arm is tilted in only one axial direction by a contact pressure during measurement; and a detector for detecting displacement of the arm through measuring an elastic deformation of the leaf spring caused by the contact pressure exerted to the stylus being pressed against the surface of an object to be measured. The arm which is thin and light and serves as a moving part of the probe is supported by the leaf spring and can thus be moved easily in one direction. Accordingly, the probe is minimized in the construction of the distal end thus realizing measurement of profiles in a very narrow space. Also, the leaf spring which is tiltable in one direction prevents production of errors due to adverse displacement of the stylus caused by inclination of the measuring surface or the stress of friction, as compared with a conventional bearing mechanism which causes a jerky movement of the stylus resulting in errors of the measurement.

The detector may comprise a mirror fixedly mounted to the proximal end of the arm, a light projector located stationarily on a side of a reflecting surface of the mirror, and a light position detector for detecting a position of a reflected light by receiving a light emitted from the light projector and reflected on the mirror.

Since the arm is provided at its proximal end with the mirror for detecting a tilting angle thereof, no heavy transformer is required. The weight of a moving mechanism including the arm and the leaf spring is decreased to less than 1 g, hence increasing the response frequency to 200 Hz and decreasing the contact pressure to below 0.2 g. This allows the surface to be precisely scanned or traced in accordance with exact changes in shape, improving the efficiency of measurement and the accuracy of resultant measurements.

The arm holding member may substantially have a V shape and be linked at two upper ends of the V shape to the stationary part of the apparatus and fixedly mounted at a lower end of the V shape to the portion close to the proximal end of the arm. This allows the tilting angle of the arm to be converted at high linearity to positional data of reflected luminous flux, hence increasing preciseness in measurement.

The leaf spring is fixed to a rod which is supported by resilient retaining strips at the stationary part of the apparatus in such a way that the rod is retained by a frictional force and remains stationary under a normal rate of the contact pressure, while the rod rotates when an excessive rate of the contact pressure is exerted to the arm. Accordingly, when an overload is applied to the arm vertically to the direction of the contact pressure, the arm can be released therefrom by rolling action of the rod, thereby preventing the probe from being damaged. The rod includes any cylindrical members having a substantially round cross-section (including incomplete circles) and may be either a solid or a hollow material.

The retaining strips let the rod slip out of engagement to release the arm when the stylus receives an excessive rate of force. This prevents any physical damage to the probe.

The profile measuring apparatus may further comprise a moving table for moving either the probe or a surface of the object being measured in a direction to vary the distance between the probe and the surface of the object, and a scale for measuring a range of movement of the moving table, in which coordinates of a target point on the surface of the object are calculated by summing measurement results of the scale and an amount of displacement of the stylus caused by the contact pressure during the measurement. Accordingly, the coordinates of the target point can be obtained from a wider area relative to the movable range (e.g. 1 mm) of the probe.

The profile measuring apparatus may further comprise a controller for feeding back a signal output of the light position detector to a driving means of the moving table in order to keep the displacement of the stylus caused by the pressure during measurement constant, and a moving table for moving either the probe or a surface of the object being measured in a direction which is substantially vertical to the direction for varying the distance between the probe and the surface of the object, so that the stylus scans the surface of the object for measurement under a constant rate of the contact pressure. This allows the stylus to scan the surface under a constant contact pressure hence ensuring continuous measurement of profiles throughout a wider area.

The moving table may be arranged to move the probe in three directions X, Y, and Z, and includes a θ stage for rotating the object being measured. Accordingly, measurement in the polar coordinate system will easily be carried out. The roundness and the correctness of a cylindrical shape can be detected allowing the profile of a scroll shape to be precisely measured.

The profile measuring apparatus may be provided with a plurality of styluses mounted to the distal end of the arm to face various directions. When the two styluses are mounted on the distal end of the arm to face opposite directions, they can be accessed to the object from both sides to measure its thickness. Also, the two styluses may be shaped of different configurations suited for their respective targets, e.g. surface roughness and envelope size.

The profile measuring apparatus may be modified wherein the moving table includes an X stage and a Y stage, in which: a moving range of the X stage is scaled by reading an X coordinate from a phase change in a reflected waveform of a laser beam with the use of a laser beam emitting means and a laser beam receiving means which are arranged to move relative to a mirror having reflecting surfaces in the Y and Z directions; and a moving range of the Y stage is scaled by reading a Y coordinate from a phase change in a reflected waveform of a laser beam with the use of a laser beam emitting means and a laser beam receiving means which are arranged to move relative to a mirror having reflecting surfaces in the X and Z directions. The scales for measuring the X and Y coordinates are operable with a laser beam hence eliminating measurement errors caused by the pitching, yawing, and rolling movements of the X or Y stage. For example, when the Y and Z oriented reflecting surface of the mirror has a flatness of under 0.05 µm, a poor level of the straightness of the Y stage generates no measurement error. As a result, the profile measuring apparatus can perform the measurement in the order of less than 0.1 µm.

The profile measuring apparatus may have at least two probes for detecting displacements in the X direction and in the Y or Z direction. This allows the verticalness between the upper, lower, and side surfaces to be measured in the order of 0.1 µm.

BRIEF DESCRIPTION OF THE DRAWINGS

FIG. 7A is a front view and FIG. 7B is a cross-sectional, illustrating a probe of a profile measuring apparatus according to another embodiment of the present invention.

PREFERRED EMBODIMENTS OF THE INVENTION

Embodiments of the present invention will be hereinafter described referring to FIGS. 1 to 6.

Figure 1A:
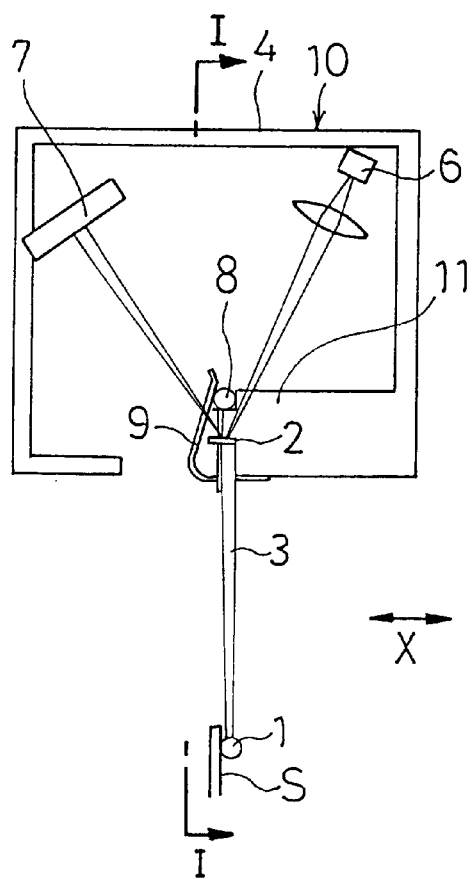
FIG. 1A is a front view and FIG. 1B is a cross-sectional view taken along the line I—I of FIG. 1A, illustrating a probe of a profile measuring apparatus according to one embodiment of the present invention.
Figure 1B:
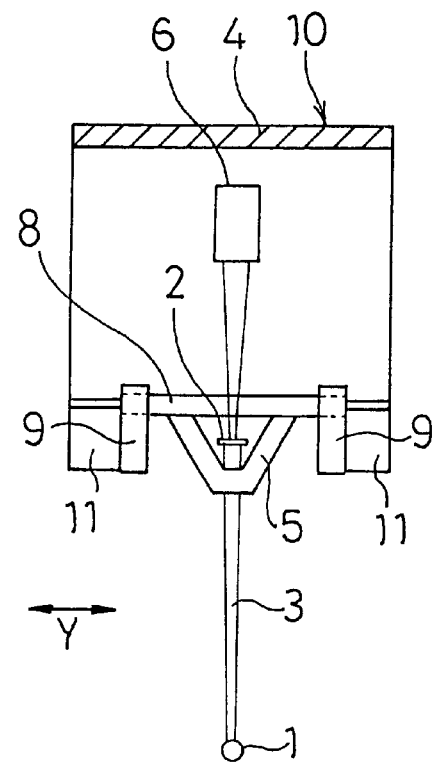

FIG. 1A is a front view and FIG. 1B is a cross-sectional view taken along the line I—I of FIG. 1A, illustrating schematic views of a probe 10 (a measuring head) in a profile measuring apparatus according to one embodiment of the present invention. In FIG. 1, there is provided a stylus 1 for directly tracing the surface of a target area of an object S under a predetermined measuring pressure, being appropriate for measuring the profile of a side wall of a very small bore. The stylus 1 is made of a high wear-resistant, hard material such as ruby having a ball-, lead-, or needle-like shape of about 1 mm and is mounted to the distal end of an arm 3. The length of the diameter depends on the shape and size of the object to be measured.

The arm 3 is made of a light, rigid material moderately tapered from the stout proximal end to the distal end. A small, thin mirror 2 of circular shape is joined by an adhesive to the proximal end of the arm 3 at right angles to the axis of the arm 3 so that its reflecting surface faces upward. Further, mounted diagonally above the mirror 2 are a light projector 6 (including a light source and a focusing lens) for projecting a flux of light to the mirror 2 and a light position detector 7 responsive to reflected light from the mirror 2 for producing a light position signal indicative of a displacement of the light flux spot caused by a change of the orientation or location of the mirror 2, both being disposed in symmetrical relationship about the axis of the mirror 2. The mirror 2, the light projector 6, and the light position detector 7 are installed in a housing case 4 which is made of an opaque material and has a lower side thereof opened in part.

The displacement of the arm 3 may be detected by any other appropriate means, such as a static capacitance sensor or a magnetic sensor, than the optical detecting means.

Referring to FIG. 1B, an arm holding member 5 is made of a thin leaf spring and formed of substantially a V shape (or U or curved shape) in symmetry. The axis of the arm 3 is aligned with the center line of the V shape of the arm holding member 5. More specifically, the bottom of the V-shaped arm holding member 5 is fixedly coupled to an upper region near the proximal end of the arm 3 so that the mirror 2 locates at substantially the center of the V shape of the arm holding member 5.

The arm 3, the stylus 1, the mirror 2, and the leaf spring (arm holding member) 5 constitute a movable assembly which is light weighted and preferably less than one gram in total to maintain the measuring pressure at 0.2 g or smaller.

The V-shaped arm holding member 5 is fixed at its two upper ends to a horizontally extending rod 8. The rod 8 is supported between a pair of retainer strips 9 made of leaf springs which are mounted to a pair of block supports 11 respectively projecting inwardly from the lowermost end of the case 4. The rod 8 may not necessarily be made of a cylindrical member, and may have smooth, round surface areas instead, to which the pressure from the retainer strips 9 is exerted, or it may be a hollow tube.

Figure 2:
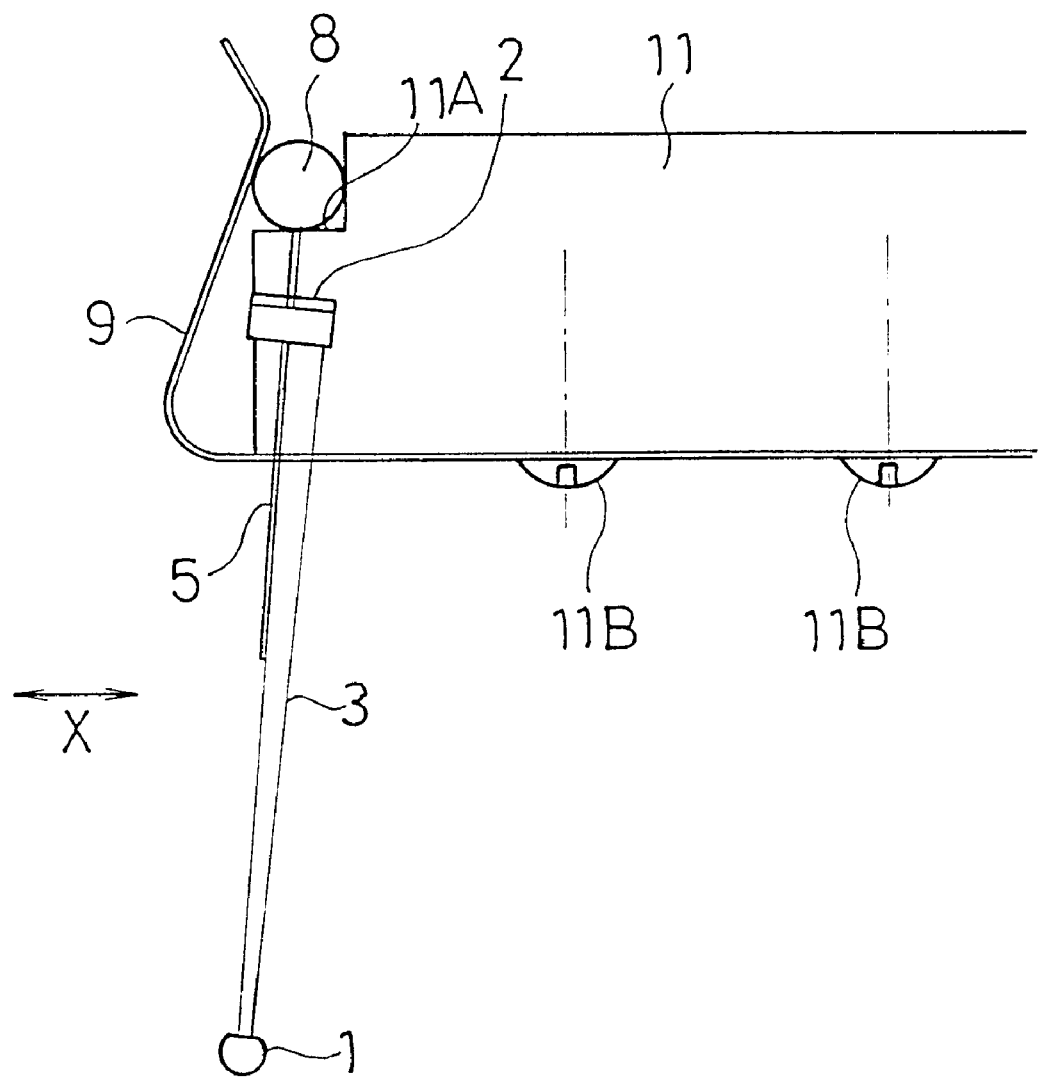
FIG. 2 is an enlarged view of a primary part of probe shown in FIG. 1A.

FIG. 2 illustrates the rod retaining assembly shown in FIG. 1A in detail. The block support 11 has a step surface 11A provided at an upper left corner thereof. The retainer strips 9 of a resilient material are disposed opposite to the step surface 11A for holding the rod 8 therebetween. The rod 8 is urged toward a corner of the step surface 11A by a yielding force of the retaining strips 9, being retained at a predetermined axial position by a frictional force.

The retainer strips 9 are made of a tenacious, elastic material such as steel, phosphor bronze, or synthetic resin, and are bolted to the lower surface of the block support 11 by setscrews 11B. The pressing force exerted by the retainer strips 9 is set to have such an effect that only the arm holding member 5 bends upon reception of a measuring pressure within a normal range and the rod 8 remains stationary, while the rod 8 rolls without elastic deformation of the arm holding member 5 when the measuring force is excessive.

By the configuration shown in FIG. 2, the probe 10 is prevented from being damaged even when an excessive measuring pressure is exerted to the stylus 1, by the action of the rod 8 rolling, thereby letting out the excessive force. Further, the retaining strips 9 have such a capacity that they come apart at their upper parts to let the rod 8 slip out of engagement, when an excessive force is exerted thereto from below or from the direction crossing at right angles with a vertical plane. Mechanical damages to the probe 10 can be thereby obviated owing to such a configuration, wherein the moving part of the probe 10 can escape upwards from too much force. Also, the simple structure of the retaining strips 9 that the upper parts come apart by resiliency enables the probe 10 to be easily returned to its original state.

The distal end of the probe 10 is so minutely constructed that it is possible to perform a measuring operation even in a very narrow space, as well as to trace the exact profile of the surface being measured, covering any subtle changes in shape, owing to decrease in weight of the moving part of the probe 10. Also, the arm 3 to which the stylus 1 is fixed is supported by the arm holding member 5, as a result of which the arm 3 moves only in one direction by the measuring pressure, not slipping off sideways or causing jerky movements as in a conventional bearing mechanism.

The direction of tilting displacement of the arm holding member 5 and the direction of displacement of the mirror 2 with respect to an arm supporting point of the arm holding member 5 are opposite to each other. Thus, the mirror 2 does not change in its position but only in its inclination, even when the arm holding member 5 bends upon receiving a pressure exerted to the stylus 1 by contacting with a surface of the object S for measurement (referred to as 'measuring pressure' in this description). Positional changes of the stylus 1 can thereby be linearly converted to data regarding positional changes of light.

Although the mirror 2 in the probe 10 shown in FIG. 1 and 2 is fixed to the upper end of the arm 3 of a rod-like shape, it is also possible to construct the probe 10 as will be explained below referring to FIG. 7.

In FIG. 7A and 7B, the numeral 1 represents a stylus; 2A is a mirror; 3A is a board-like arm; 5A is an arm holding member made of a leaf spring formed of a V shape; 8 is a rod; S is an object to be measured; 51 is a laser beam; and 52 is a light path altering mirror. The stylus 1 is fixedly coupled to a lowermost side face of the substantially triangle arm 3A. The arm 3A overlaps and is joined to a lower part of the leaf spring 5A. The V-shaped leaf spring 5A is fixed at its two upper ends to the rod 8. The mirror 2A is attached to a side face of the leaf spring 5A, i.e., the mirror 2A is fixed to a side face of the arm 3A in substance.

The light path altering mirror 52 disposed at the side of the mirror 2A directs a laser beam 51 emitted from a light projector (not shown) to be beamed on the mirror 2A. The reflected light runs in the substantially same light path as that of the laser beam 51 and returns to a light position detector (not shown). The deflection of the stylus 1 following a surface profile of the object S is in such a way converted to angular changes of the mirror 2A, which is then converted into the displacement of light positions of the laser beam 51 detected by the light position detector. The displacement of the surface profile of the object S is thereby precisely measured.

Similarly, the mirror 2A may be mounted diagonally with respect to the arm 3A.

Figure 3:
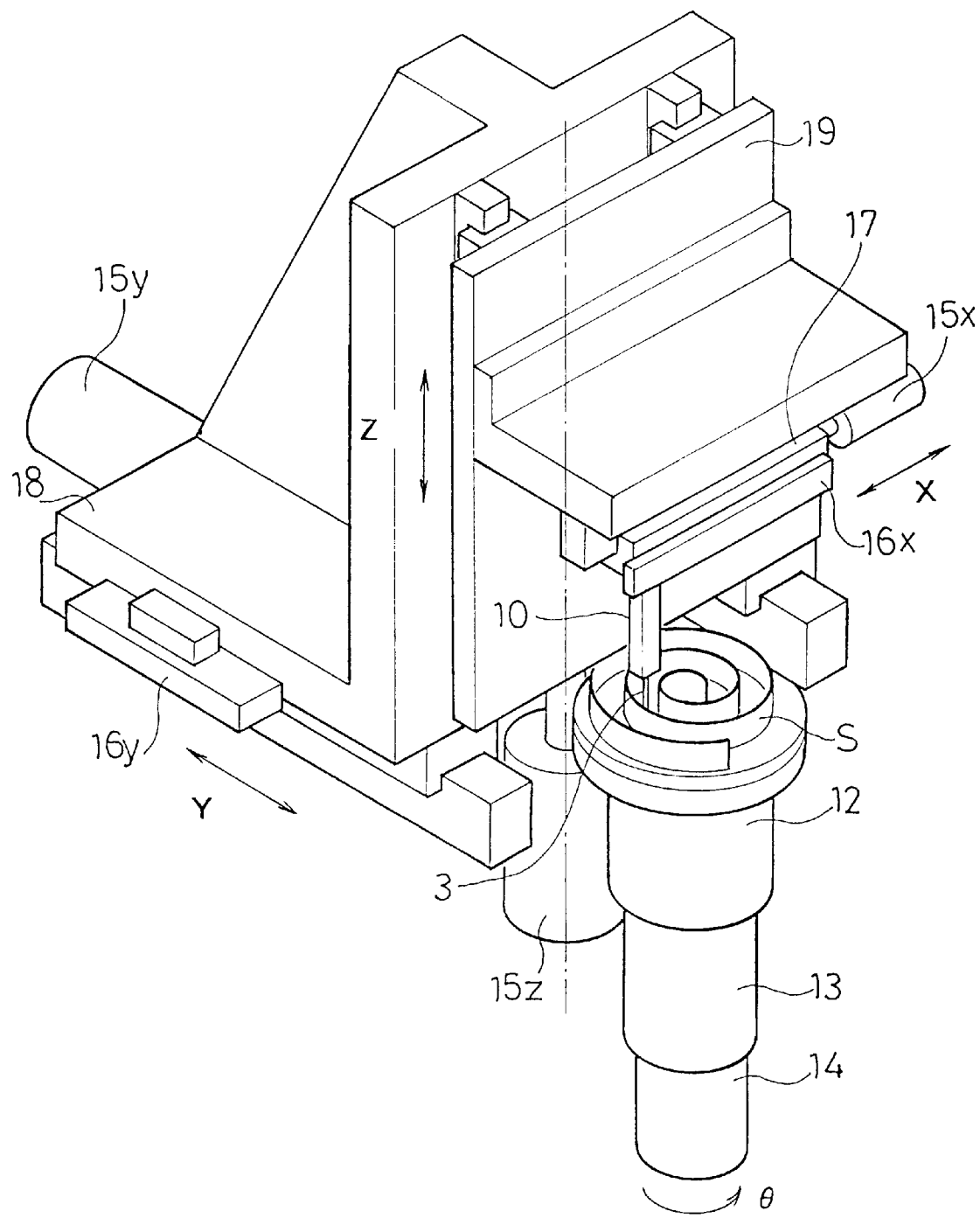
FIG. 3 is a perspective view of the profile measuring apparatus of the present invention.
Figure 4:
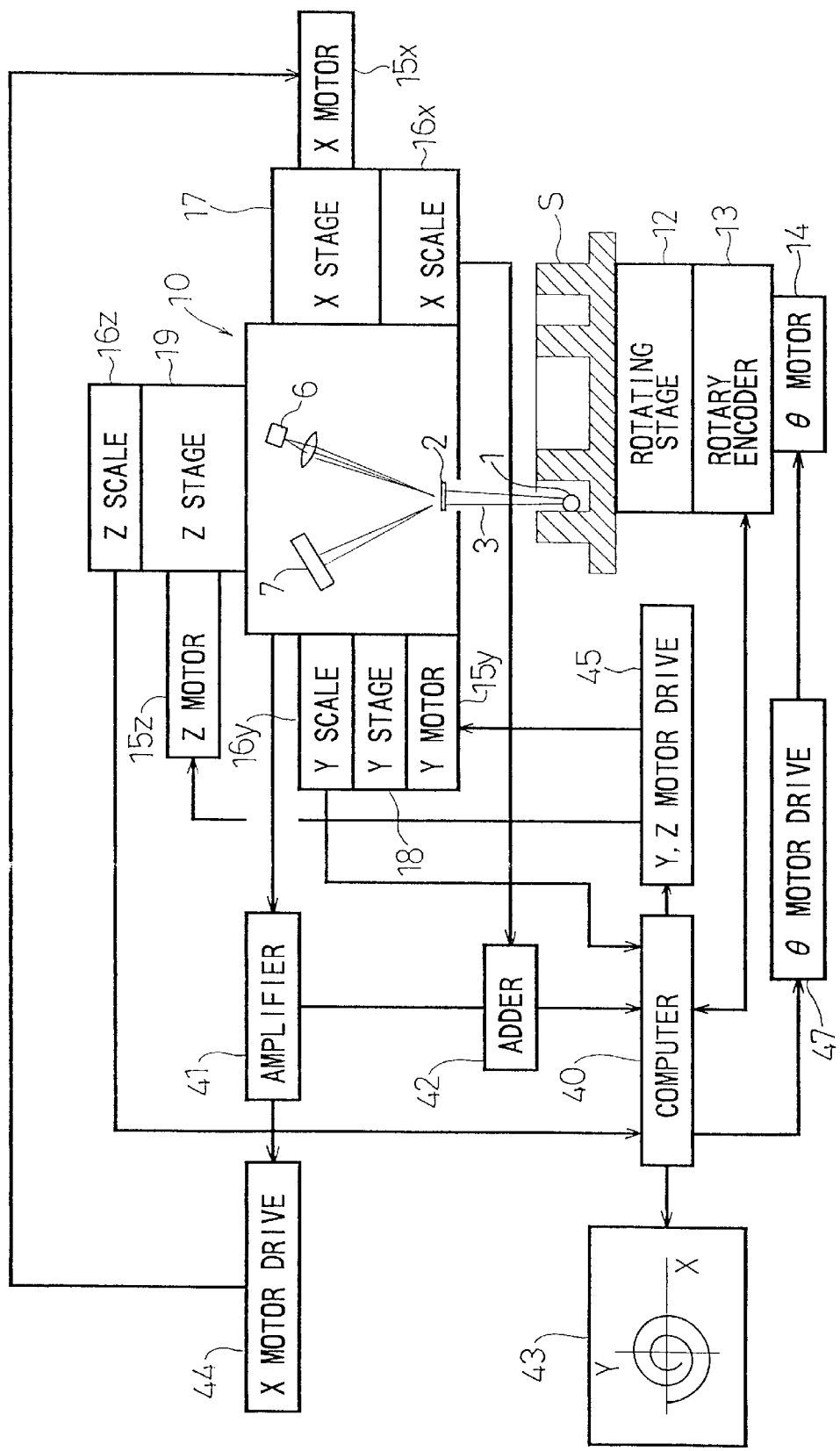
FIG. 4 is a block diagram of a signal system in the apparatus.

FIGS. 3 and 4 show the entire arrangement of the profile measuring apparatus of the first embodiment of the present invention. FIG. 3 is a schematic structural view and FIG. 4 is a block diagram of a signal processing system of the apparatus. This embodiment is related to measurement of the profile of a scroll blade in an air-conditioner scroll compressor.

As shown in FIG. 3, the probe 10 is capable of measuring orthogonal coordinates and polar coordinates of an object S. The probe 10 is moved in three directions X, Y, and Z by a carrier which includes an X stage 17, a Y stage 18, and a Z stage 19. The object S is rotated in one direction θ by an air spindle or a rotary stage 12. As the rotary stage 12 is driven by a motor 14, the rotating angle of the object or the scroll blade S on the rotary stage 12 is read by a rotary encoder 13.

The X stage 17 is supported on the Z stage 19 which is supported by the Y stage 18, thus constituting a three-dimensional station. The probe 10 is mounted to the X stage 17 so that its arm 3 is inserted in a gap of the scroll blade S. The X, Y and Z stages 17, 18, 19 are driven by motors 15$x$, 15$y$, and 15$z$ respectively.

The three stages 17, 18, and 19 are provided with linear scales 16$x$, 16$y$, and 16$z$ (FIG. 4) respectively for reading their precise locations. As the stylus 1 mounted to the distal end of the arm 3 runs on the surface of the scroll blade S, its three-dimensional movement is measured in the order of 1 μm.

As shown in FIG. 3, the scroll blade S has a spiral shape which is expressed partially by the cylindrical coordinates, and at a central portion by the orthogonal coordinates. Also, the profile may be expressed in an appropriate statement depending on the use of an air conditioner (for domestic, heavy industrial, or vehicle installation uses) where the scroll blade S is mounted. The profile measuring apparatus hence employs a θ axis in addition to the X, Y, and X axes. Furthermore, a set of software programs for converting the measurements to coordinate values for ease of comparison with design formulas, compensating unwanted installation errors, and computing discrepancies of the designed values are installed in a computer 40 (FIG. 4) operable for data process and control.

For measuring its profile, the scroll blade S is rotated in the θ direction with the X-axis drive motor 15$x$ actuated under feedback control so that the arm 3 is held at a substantially constant angle to the surface of the scroll blade S while the distance from the center of rotation to a target point on the surface is varied. While the rotating angle of the scroll blade S is read by the rotary encoder 13 coupled to the rotary stage 12, the X axial location of the stylus 1 is obtained. Through calculating the readings of the X-axis scale 16$x$ and the Y-axis scale 16$y$ in the computer 40, the stylus location at the rotating angle is converted to an X-Y coordinate value. The results of the measurement are then compared with their respective design values to produce differences. The control along the Y axis in addition to the X axis and the θ axis is needed for measurement about the center of the scroll blade S. When the probe 10 is scanned in the Z direction as well as the other directions, the entire surface of the scroll blade S can be measured.

FIG. 4 illustrates the signal processing system related to the structural arrangement shown in FIG. 3. The X, Y, and Z stages 17, 18, 19, the rotary stage 12, and the probe 10 feed the computer 40 with their respective detection signals as well as are controlled by control signals of the computer 40.

More particularly, the light position detector 7 first produces a light position signal indicative of inclination of the arm 3. The light position signal is then amplified by an amplifier 41 and fed to an X-axis motor drive 44 which in turn actuates the X-axis motor 15$x$. This causes the arm 3 to remain at substantially a constant angle and the stylus 1 to trace the surfaces of the object S under a substantially constant pressure for continuously performing two- or three-dimensional scanning over an extended area. The X-axis motor 15$x$ also receives a feedback of the light position signal.

Since the detection signal from the X-axis scale 16$x$ is transmitted to an adder 42 where it is added with the light position signal from the amplifier 41, absolute values of an X coordinate, i.e., the resultant sum, can be obtained from a wider range. The calculated absolute values of the X coordinate are then delivered to the computer 40. The adder 42 may be accommodated in the computer 40. Denoted by the numeral 43 is a display and/or a printer for displaying or plotting the measurements in the form of drawings or graphic representations.

The detection signals from the Y-axis scale 16$y$ and the Z-axis scale 16$z$ are also fed to the computer 40 where they are duly processed before being transmitted to a Y-axis motor drive 45 and a Z-axis motor drive 46, respectively, for driving their respective motors 15$y$ and 15$z$.

The detection signal from the rotary encoder 13 is compared with data of the control programs in the computer 40 which in turn delivers a corresponding control signal to a θ-axis motor drive 47 for driving the θ-axis motor 14.

As shown in FIG. 4, the light position signal indicative of an inclination of the arm 3 is outputted from the light position detector 7 and fed back to the X-axis motor drive 44. In response, the motor drive 44 produces a drive output for maintaining the arm 3 to a substantially constant angle of tilting to keep the measuring pressure substantially constant. The X-axis motor 15x is driven by the drive output of the motor drive 44 for continuously performing the two- or three-dimensional scanning over the extended area of the surface to be measured. The feedback may selectively be applied for control in either the positive or negative direction of the X-axis in order to measure both sides of the target.

A range of the movements of the X, Y, and Z stages 17, 18, and 19 while the stylus 1 traces the surface of the object S for two- or three-dimensional scanning are read by their respective linear scales 16x, 16y, and 16z in the order of 1 μm. This is adequate for measuring the scroll blade S because the accuracy required for measurement thereof is more or less 3 μm. The angular position of the scroll blade S is also measured by the rotary encoder 13 with adequate accuracy.

Figure 5:
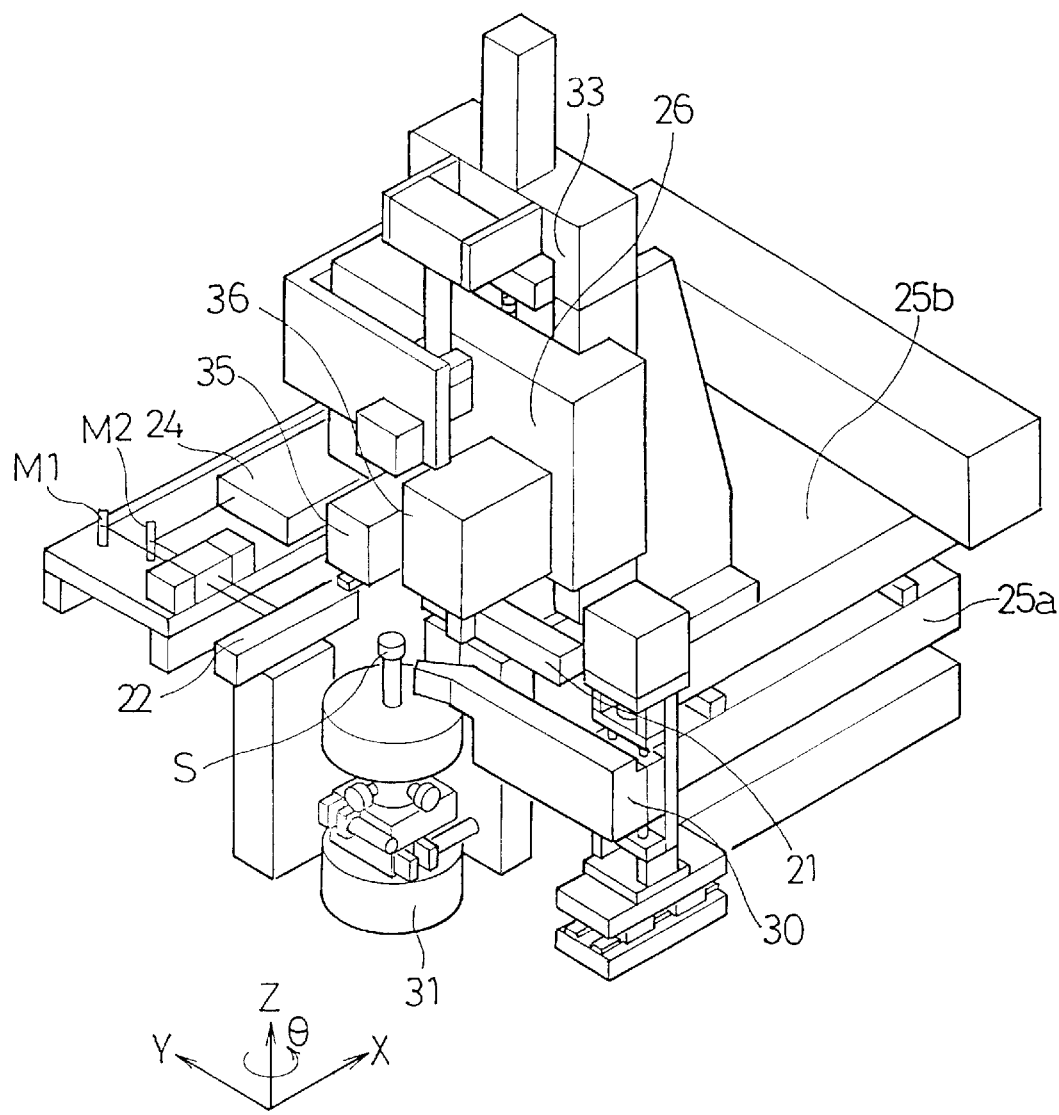
FIG. 5 is a perspective view of a profile measuring apparatus showing another embodiment of the present invention.
Figure 6:
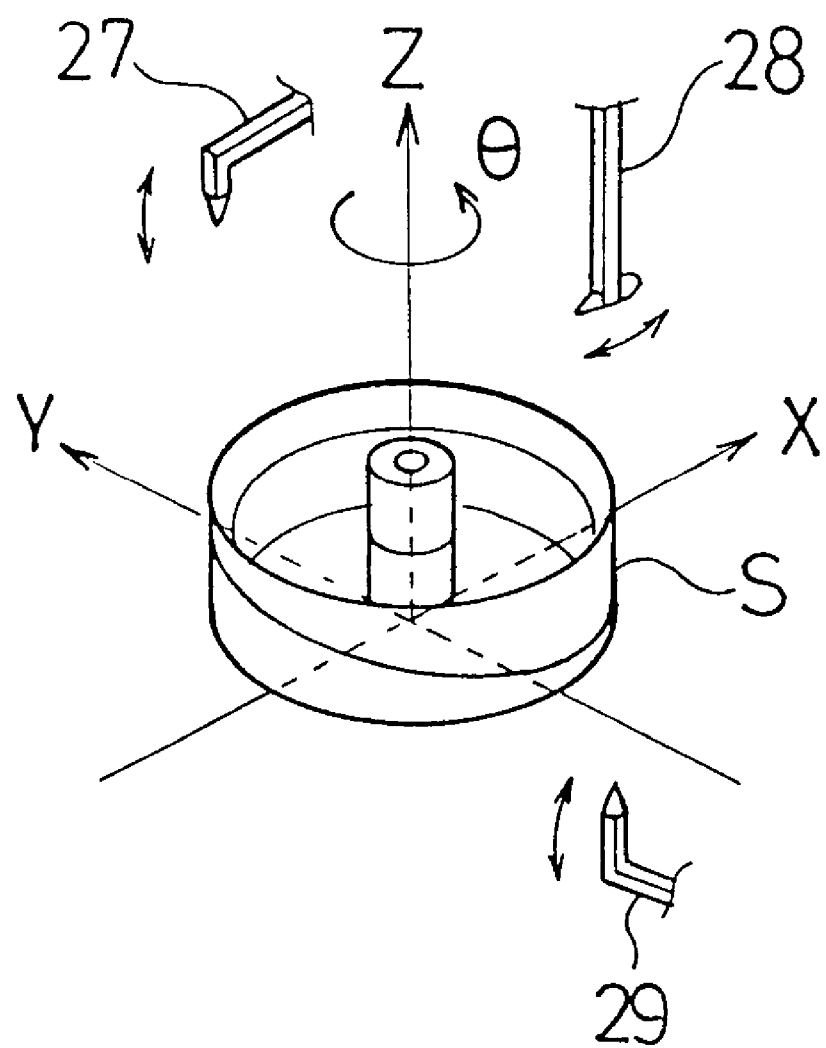
FIG. 6 is a perspective view showing an object to be measured and various probes of the apparatus.

FIGS. 5 and 6 show another embodiment of the present invention which is intended to implement a profile measuring apparatus capable of measuring with even higher accuracy than the first embodiment.

FIG. 5 shows the entire structural arrangement of the profile measuring apparatus of the second embodiment which may preferably be used for measuring the profile of a digital video tape recorder cylinder. FIG. 6 is an enlarged view of the apparatus of FIG. 5 showing a stylus and an object to be measured. Three probes 27, 28, and 29 shown in FIG. 6 are respectively provided for measurement of the thickness, internal and external diameter, and surface roughness. The probe 28 includes round- and pin-pointed styluses mounted to the distal end of an arm in opposite directions. As shown in FIG. 5, the measurement in the X- and Y-axis is carried out with a position measuring means which comprises a laser instrument and a high precision mirror(s) in place of the linear scales.

In FIG. 5, a Y stage 25b for movement in the direction of the Y axis is located on an X stage 25a for movement in the direction of the X axis. A column block 33 is vertically mounted on the Y stage 25b. A Z stage 26 is mounted by static pressure bearings to the column block 33 for movement in the direction of the Z axis. A digital video tape recorder F cylinder S to be measured is loaded on a rotary stage 31.

The measurement of movements in the directions of the X- and Y-axes is carried out by reading an X coordinate from a phase change in the waveform of a laser beam projected in the X-axis direction and reflected on an X-axis mirror 21 of which surface extends in the Y- and Z-axis directions, and by reading a Y coordinate from a phase change in the waveform of a laser beam projected in the Y-axis direction and reflected on a Y-axis mirror 22 of which surface extends in the X- and Z-axis directions.

The X-axis mirror 21 and the Y-axis mirror 22 have a flatness of 0.01 μm and fixedly mounted to two stationary members, respectively, which are disposed separately from the stages so that they extend vertical to the X- and Y-directions respectively. Mounted on the Y stage 25b are an interference pattern counter 24 and a couple of reflecting mirrors M1 and M2 for changing the light path to 90 degrees for directing a laser beam 23 emitted from a laser source (not shown). If it is assumed that the measurement is now carried out in the Y-axis direction, the laser beam 23 from the laser source running in parallel to the X axis as denoted by an arrow L is beamed on the mirror M1 at the incident angle of 45 degrees. The laser beam 23 reflected by the mirror M1 then runs in the Y-axis direction and enters the Y-axis mirror 22 vertically. The laser beam 23 reflected by the Y-axis mirror 22 returns along the Y-axis and is reflected by the second mirror M2 to 45 degrees and directed to the interference pattern counter 24. When the Y stage 25b moves in the Y-axis direction, the length of the light path of the laser beam 23 extending from the laser source to the interference counter 24 is varied. This allows a Y-axis directional movement of the Y stage 25b to be measured by the interference pattern counter 24 in the order of 0.1 μm. The laser source may preferably be a He—Ne laser device which is stable in oscillation frequency.

The measurement of movements in the X-axis direction is similarly carried out by an optical system being substantially identical to the one described above for the Y-axis movement measurement.

As described above, the apparatus shown in FIG. 5 incorporates an improved coordinate system with the X-axis mirror 21 and the Y-axis mirror 22 for the laser beam 23, where any movement can be measured with high accuracy in the order of 0.1 μm even when the straightness in movement of the X stage 25a and the Y stage 25b is more than 1 μm.

The apparatus of this embodiment includes three probes 27, 28, and 29 for measurement of the upper surface and the profile of a lead, the side surface, and the lower surface as shown in FIG. 6.

More particularly, the lead (upper surface) probe 27 is mounted on a support 35 anchored to the Z stage 26 for measurement of the upper or lead (tape guide) surface of a video cylinder. The probe 27 has a pointed stylus shaped by downwardly bending the distal end of a horizontally extending body, as shown in FIG. 6.

The probe 28 for measurement of the side surface or the diameter of a bore is mounted on a support 36 anchored to the Z stage 26. As shown in FIG. 6, the probe 28 has two styluses provided on the lowermost end of a Z-axis arm thereof and extending in the positive and negative directions of the X axis respectively. One of the two styluses is sharply pointed having a curvature radius of e.g. 10 μm and the other is rounded having a curvature radius of e.g. 250 μm.

The probe 29 is mounted on the distal end of a lower surface probe support 30 anchored to the Z stage 26 for measurement of the lower surface of the video cylinder. The probe 29 has a pointed stylus shaped by upwardly bending the distal end of a horizontally extending body, as shown in FIG. 6.

Although the profile measuring apparatuses described above are intended for measurement of the profile of a scroll blade and video tape recorder cylinder, they may be modified by changing the shape and number of probes or styluses and the characteristics of coordinates system for desired applications.

The measuring apparatus according to the first embodiment of the present invention includes the linear scales for the X, Y, and Z axes for measurement in the order of 1 μm more or less. This is designed concerning that the accuracy required for common scroll blades is substantially 3 μm. It is impossible to further increase accuracy in this configuration for three reasons. Firstly, the straightness in movement of the X and Y stages is in the order of 1 μm allowing the movement to be precisely measured in the X-axis direction but when the movement is in the Y- or Z-axis direction, no poor result of the straightness along the Y or Z axis will be detected hence causing an error of the X coordinate. Secondly, the linear scale fails to be located on a line extending from the measuring point along the X- or Y-axis, whereby when the X or Y stage is tilted in any of pitching, yawing, and rolling directions, the coordinates of the measuring point will be out of a legible range of the scale. Thirdly, the linear scale itself has an error of the order of 0.2 μm.

The profile measuring apparatus according to the second embodiment of the present invention employs a laser distance measurement technique in both the X and Y axes for measurement in the order of 0.1 μm. The laser beam 23 emitted from an oscillation frequency stabled He-Ne laser is directed to the X-axis mirror 21 and the Y-axis mirror 22 which both have a surface flatness of 0.01 μm and its reflection is then read by the interference pattern counter 24.

The arrangement shown in FIG. 5 is hence provided for eliminating the above-described three causes of errors in the first embodiment.

First of all, while the straightness in movement of the X and Y stages is in the order of 1 μm, the X, Y coordinates are governed by not the movement straightness of the X and Y stages but the flatness of the X-axis mirror 21 and the Y-axis mirror 22. Accordingly, the straightness of less than 0.01 μm will be achieved in both the X axis and the Y axis. As the Z stage 26 uses the static pressure bearing having a straightness of smaller than 0.05 μm, the use of linear scales may be possible. It is however understood that the laser distance measurement is most preferable. The second drawback that pitching, yawing, or rolling of the X stage 25a and the Y stage 25b produces an error will be avoided since the laser distance measurement is implemented on the line extending from the measuring point on the X and Y axes. The Z axis associated with the static pressure bearings is less affected by the error caused by pitching, yawing, or rolling. The third drawback is eliminated since the laser distance measurement is implemented in the order of smaller than 0.1 μm.

Accordingly, the profile measuring apparatus of the second embodiment can determine coordinates of each measuring point in the order of less than 0.1 μm without having the adverse effects of poor straightness of the moving stages and of pitching, yawing, and rolling.

Also, the embodiment of the present invention incorporates a combination of the probe 27 for measurement of the upper surface and the lead profile, the probe 28 for measurement of the side surface, and the probe 29 for measurement of the lower surface, thus allowing the verticalness of upper, lower, and side surfaces to each other to be measured in the order of 0.1 μm.

Further, the probe 28 shown in FIG. 6 has two opposite styluses mounted on the distal end of its arm. When the distance between the points of the two styluses has precisely been measured, it is used to calculate the diameter of a bore from the location of two opposite walls of the bore.

One of the two opposite styluses is sharply pointed at tip a and the other is rounded. The sharply pointed stylus is favorable for measurement of small roughness on a measuring surface and profile of a fluid bearing groove. The rounded stylus is preferably used for measurement of profiles of an outer contact surface without following small undulations formed by machining.

As set forth above, the present invention allows profiles of any surface even in a small aperture or bore to be measured with a high level of response and with high accuracy, namely, in the order of 0.1 μm without being seriously damaged. Also, one profile measuring apparatus of the present invention can perform an automatic measurement of multiple points of an object, e.g. the lead portion of a digital video tape recorder cylinder, in conjunction with relevant automatic measurement programs without moving the object from one measuring station or apparatus to another.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

We claim:

1. A profile measuring apparatus having a probe comprising:
   an arm having a stylus fixedly mounted to a distal end thereof;
   an arm holding member made of a leaf spring which extends vertically such as to allow itself to deform elastically in a direction orthogonal to the vertical direction for coupling a portion close to a proximal end of the arm to a stationary part of the apparatus such as to permit the arm to be tilted in only one direction orthogonal to the vertical direction by a contact pressure during measurement; and
   a detector for detecting displacement of the arm through measuring an elastic deformation of the leaf spring caused by the contact pressure exerted to the stylus being pressed against the surface of an object to be measured.

2. A profile measuring apparatus according to claim 1, wherein the detector comprises a mirror fixedly mounted to the proximal end of the arm, a light projector located stationarily on a side of a reflecting surface of the mirror, and a light position detector for detecting a position of a reflected light by receiving a light emitted from the light projector and reflected on the mirror.

3. A profile measuring apparatus according to claim 2, wherein the arm holding member has substantially a V shape and is linked at two upper ends of the V shape to the stationary part of the apparatus and fixedly mounted at a lower end of the V shape to the portion close to the proximal end of the arm.

4. A profile measuring apparatus according to claim 3, wherein the leaf spring is fixed to a rod which is supported by resilient retaining strips at the stationary part of the apparatus in such a way that the rod is retained by a frictional force and remains stationary under a normal rate of the contact pressure, while the rod rotates when an excessive rate of the contact pressure is exerted to the arm.

5. A profile measuring apparatus according to claim 4, wherein the retaining strips let the rod slip out of engagement with the retaining strips to release the arm when the stylus receives an excessive rate of force.

6. A profile measuring apparatus according to claim 5, further comprising a moving table for moving either the probe or a surface of the object being measured in a direction to vary the distance between the probe and the surface of the object, and a scale for measuring a range of movement of the moving table, in which coordinates of a target point on the surface of the object are calculated by summing measurement results of the scale and an amount of displacement of the stylus caused by the contact pressure during the measurement.

7. A profile measuring apparatus according to claim 6, further comprising a controller for feeding back a signal output of the light position detector to a driving means of the moving table in order to keep the displacement of the stylus caused by the pressure during measurement constant, and a moving table for moving either the probe or a surface of the object being measured in a direction which is substantially vertical to the direction for varying the distance between the probe and the surface of the object, so that the stylus scans the surface of the object for measurement under a constant rate of the contact pressure.

8. A profile measuring apparatus according to claim 7, wherein the moving table is arranged to move the probe in three directions X, Y, and Z, and includes a θ stage for rotating the object being measured.

9. A profile measuring apparatus according to claim 8, wherein a plurality of the styluses are mounted to the distal end of the arm to face to various directions.

10. A profile measuring apparatus according to claim 6, wherein the moving table includes an X stage and a Y stage, in which: a moving range of the X stage is scaled by reading an X coordinate from phase change in a reflected waveform of a laser beam with the use of a laser beam emitting means and a laser beam receiving means which are arranged to move relative to a mirror having reflecting surfaces in the Y and Z directions; and a moving range of the Y stage is scaled by reading a Y coordinate from phase change in a reflected waveform of a laser beam with the use of a laser beam emitting means and a laser beam receiving means which are arranged to move relative to a mirror having reflecting surfaces in the X and Z directions.

11. A profile measuring apparatus according to claim 10, having at least two probes for detecting displacements in the X direction and in the Y or Z direction.

12. A profile measuring apparatus according to claim 1, wherein the detector for detecting displacement of the arm comprises:
   a mirror fixed to a side face of the arm;
   a light projector disposed above the mirror on a side of a reflecting surface of the mirror;
   a light position detector for detecting a position of a reflected light by receiving a light emitted from the light projector and reflected by the mirror; and
   a light path altering mirror for directing a light emitted from the light projector onto the mirror, as well as directing a reflected light thrown back by the mirror to the light position detector.

13. A profile measuring apparatus having a probe comprising:
   an arm having a stylus fixedly mounted to a distal end thereof,
   an arm holding member made of a leaf spring which couples a portion close to a proximal end of the arm to a stationary part of the apparatus in such a way that the arm is tilted in only one direction by a contact pressure during measurement; and
   a detector for detecting displacement of the arm through measuring an elastic deformation of the leaf spring caused by the contact pressure exerted to the stylus while being pressed against the surface of an object to be measured, wherein the detector comprises a mirror fixedly mounted to the proximal end of the arm, a light projector located stationarily on a side of a reflecting surface of the mirror, and a light position detector for detecting a position of a beam of light that is emitted from the light projector and reflected by the mirror, by which an inclination angle of the stylus is determined.

14. A profile measuring apparatus according to claim 13, wherein the arm holding member has substantially a V-shape and is linked at two upper ends of the V shape to the stationary part of the apparatus and fixedly mounted at a lower end of the V-shape to the portion close to the proximal end of the arm.

15. A profile measuring apparatus according to claim 13, wherein the detector for detecting displacement of the arm comprises a mirror fixed to a side face of the arm, a light projector disposed above the mirror on a side of a reflecting surface of the mirror, a light position detector for detecting a position of a reflected light by receiving a light emitted from the light projector and reflected by the mirror, and a light path altering mirror for directing a light emitted from the light projector onto the mirror, as well as directing a reflected light reflected back by the mirror to the light position detector.

16. A profile measuring apparatus according to claim 1, wherein the detector comprises a mirror fixedly mounted to the proximal end of the arm, a light projector located stationarily on a side of a reflecting surface of the mirror, and a light position detector for detecting a position of a beam of light that is emitted from the light projector and reflected by the mirror, by which an inclination angle of the stylus is determined.

17. A profile measuring apparatus according to claim 1, wherein the arm holding member has substantially a bifurcated shape and is linked at two upper ends of the bifurcated shape to the stationary part of the apparatus and fixedly mounted at a lower end of the bifurcated shape to the portion close to the proximal end of the arm.

18. A profile measuring apparatus according to claim 1, wherein the detector for detecting displacement of the arm comprises a mirror fixed to a side face of the arm, a light projector disposed above the mirror on a side of a reflecting surface of the mirror, a light position detector for detecting a position of a beam of light that is emitted from the light projector and reflected by the mirror, by which an inclination angle of the stylus is determined, and a light path altering mirror for directing a light emitted from the light projector onto the mirror, as well as directing a reflected light reflected back by the mirror to the light position detector.

19. A profile measuring apparatus having a probe comprising:
   a stylus;
   an arm having the stylus fixedly mounted to a distal end thereof;
   an arm holding member made of a leaf spring which couples a portion close to a proximal end of the arm to a stationary part of the apparatus in such a way that the arm is tilted in only one axial direction by a contact pressure during measurement, the arm holding member has substantially a V-shape and is linked at two upper ends of the V-shape to the stationary part of the apparatus and is fixedly mounted at a lower end of the V-shape to the portion close to the proximal end of the arm, wherein the leaf spring is fixed to a rod which is supported by resilient retaining strips at the stationary part of the apparatus so that the rod is retained by a frictional force and remains stationary under a normal rate of contact pressure, while the rod rotates when an excessive rate of contact pressure is exerted on the arm; and
   a detector assembly for detecting displacement of the arm through measuring an elastic deformation of the leaf spring caused by the contact pressure exerted to the stylus being pressed against the surface of an object to be measured including a mirror fixedly mounted to the proximal end of the arm, a light projector located stationarily on a side of a reflecting surface of the mirror, and a light position detector for detecting a position of a reflected light by receiving a light emitted from the light projector and reflected on the mirror.

20. In a profile measuring apparatus, the improvement comprising:

a stylus for contacting an object to be measured;

an arm mounting the stylus at a distal end thereof;

a detector input member mounted on the arm; and a leaf spring mounting the arm at a distal end thereof and fixedly attached at a proximal end to a support structure to define a pivot axis for the arm and stylus to rotate about during measurement, whereby excess pressure between the stylus and the measured object can be relieved by additional pivotal movement of the arm when the leaf spring deforms.

21. The invention of claim 20, wherein the detector input member is a mirror.

22. The invention of claim 20, wherein the support structure includes a second spring member to provide a release of excess pressure that would damage the leaf spring.

* * * * *